(12) United States Patent
Izumi et al.

(10) Patent No.: US 9,052,741 B2
(45) Date of Patent: Jun. 9, 2015

(54) METHOD IN A MOBILE TERMINAL FOR JUDGING A CONTACT BETWEEN AN OPERATING MEMBER AND TOUCHPAD

(75) Inventors: Takashi Izumi, Nara (JP); Kazuto Miyazaki, Daito (JP)

(73) Assignee: KYOCERA Corporation, Kyoto (JP)

( * ) Notice: Subject to any disclaimer, the term of this patent is extended or adjusted under 35 U.S.C. 154(b) by 154 days.

(21) Appl. No.: 13/818,909

(22) PCT Filed: Aug. 11, 2011

(86) PCT No.: PCT/JP2011/004559
§ 371 (c)(1),
(2), (4) Date: Feb. 25, 2013

(87) PCT Pub. No.: WO2012/026083
PCT Pub. Date: Mar. 1, 2012

(65) Prior Publication Data
US 2013/0150132 A1    Jun. 13, 2013

(30) Foreign Application Priority Data
Aug. 25, 2010    (JP) .................................. 2010-187896

(51) Int. Cl.
*H04B 1/00*     (2006.01)
*G06F 3/041*    (2006.01)
(Continued)

(52) U.S. Cl.
CPC ................ *G06F 3/01* (2013.01); *G06F 3/0418* (2013.01); *G06F 3/044* (2013.01); *H04M 1/0266* (2013.01); *G06F 3/0202* (2013.01); *G06F 3/04886* (2013.01)

(58) Field of Classification Search
CPC ........ G06F 3/041; G06F 3/044; H03K 17/962
USPC ................................... 345/173–178; 455/566
See application file for complete search history.

(56) References Cited

U.S. PATENT DOCUMENTS 5,157,312 A * 10/1992 Wallrafen .................... 318/264
7,567,240 B2 * 7/2009 Peterson et al. .............. 345/173
(Continued)

FOREIGN PATENT DOCUMENTS

| JP | S63-075919 A | 4/1988 |
| JP | H08-022361 A | 1/1996 |

(Continued)

OTHER PUBLICATIONS

International Search Report issued by Japanese Patent Office for International Application No. PCT/JP2011/004559.

*Primary Examiner* — William Nealon
(74) *Attorney, Agent, or Firm* — Procopio, Cory, Hargreaves & Savitch LLP

(57) ABSTRACT

A mobile phone 100 having a capacitive touchpad unit 102 includes a touch sensor circuit 121 that outputs measurement values each indicating a capacitance of the touchpad unit 102, a computing unit 111$a$ that computes a sensor output value based on each measurement output from the touch sensor circuit 121, a calibration coefficient updating unit 111$a$3 that updates the sensor output value by updating a calibration coefficient so as to be equal to a predetermined reference value, a judging unit 118 that detects a contact based on the sensor output values, and a judgment threshold switching unit 133 that causes the judging unit 118 to use a provisional contact-judging unit for a time period starting when the update occurs during the time that the user's face is in contact with the touchpad unit 102 and ending when it is judged that the touch to the touchpad unit 102 is released.

11 Claims, 12 Drawing Sheets

(51) Int. Cl.
*G06F 3/042* (2006.01)
*G06F 3/01* (2006.01)
*G06F 3/044* (2006.01)
*H04M 1/02* (2006.01)
*G06F 3/02* (2006.01)
*G06F 3/0488* (2013.01)

(56) References Cited

U.S. PATENT DOCUMENTS

2009/0267922 A1* 10/2009 Umeda .................. 345/178
2010/0171515 A1* 7/2010 Nakagawa et al. ........... 324/658
2010/0258361 A1 10/2010 Yamauchi et al.
2010/0289769 A1* 11/2010 Watanabe .................. 345/174
2012/0313767 A1* 12/2012 Sitarski .................. 340/425.5

FOREIGN PATENT DOCUMENTS

| | | |
|---|---|---|
| JP | 2004-054413 A | 2/2004 |
| JP | 2007-208682 A | 8/2007 |
| JP | 2007-235286 A | 9/2007 |
| JP | 2009-169697 A | 7/2009 |
| JP | 2009-265851 A | 11/2009 |

* cited by examiner

METHOD IN A MOBILE TERMINAL FOR JUDGING A CONTACT BETWEEN AN OPERATING MEMBER AND TOUCHPAD

TECHNICAL FIELD

The present invention relates to mobile terminals having a touchpad unit.

BACKGROUND ART

Mobile terminals provided with a capacitive touchpad unit have been conventionally suggested (see Patent Literature 1). The suggested capacitive touchpad unit measures a change in the capacitance of the touchpad unit at a position corresponding to each key of the touchpad unit to determine whether the key is being touched based on the measurement values.

The measurement values are sensitive to the temperature change in the touchpad unit. Therefore, the measurement values need to be corrected (calibrated) to remove the influence of the temperature change in order to accurately detect a key touch.

In addition, the temperature of the touchpad unit varies from time to time depending on various factors, including the use environment. Therefore, the calibration coefficient used for calibration of measurement values needs to be updated regularly. In addition, the update of the calibration coefficient needs to be carried out in the state where the touchpad unit is not in contact with an operating member in order to eliminate the influencing factors other than the temperature as much as possible.

In view of the above, one conventionally suggested mobile terminal regularly updates the calibration coefficient (updates the reference capacitance value) using a value measured for a key selected from the touchpad keys not in contact with an operating member (see Patent Literature 2).

CITATION LIST

Patent Literature

[Patent Literature 1]
Japanese Patent Application Publication No. 2004-54413
[Patent Literature 2]
Japanese Patent Application Publication No. 2009-265851

SUMMARY OF INVENTION

Technical Problem

With the mobile terminal described in Patent Literature 2, however, the calibration coefficient is left without being updated for a long time in the case where the mobile terminal is used in the state where all the keys constituting the touchpad unit are kept in contact with an operating member (for example, in the case where the mobile terminal is used for a telephone conversation for a long time with the user's face kept in contact with the touchpad unit).

The touchpad unit may undergo a significant temperature change during the time the calibration coefficient is left as it is without update. This results in a risk that a touch to a key is not correctly detected, which may lead to a malfunction.

The present invention is made in view of the above and aims to provide a mobile terminal capable of reducing the occurrence of a malfunction resulting from a temperature change in the touchpad unit.

Solution to Problem

In order to solve the problems noted above, a mobile terminal according to the present invention includes: a touch sensor circuit that includes a capacitive touchpad unit and outputs a measurement value indicating a capacitance for the touchpad unit; a computing unit that computes a sensor output value based on the measurement value output from the touch sensor circuit; an updating unit that updates the sensor output value so as to be equal to a predetermined reference value when the updating unit receives an update instruction; a judging unit that judges that an operating member is in contact with the touchpad unit when a sensor output value is greater than a contact-judgment threshold, and that the operating member is no longer in contact with the touchpad unit when a sensor output value falls below a noncontact-judgment threshold for the first time after the judgment that the operating member is in contact with the touchpad unit; and a judgment threshold switching unit that switches from the noncontact-judgment threshold to be used in a subsequent judgment by the judging unit to a provisional noncontact-judgment threshold for a time period starting when the update takes place while the operating member is in contact with the touchpad unit and ending when the judging unit judges that the operating member is no longer in contact with the touchpad unit.

Advantageous Effects of Invention

The mobile terminal according to the present invention achieves to reduce the occurrence of a malfunction resulting from temperature changes in the touchpad unit.

DESCRIPTION OF EMBODIMENTS

The following now describes a mobile phone as one embodiment of a mobile terminal according to the present invention.

Embodiment

<1> External Representation

Figure 1:
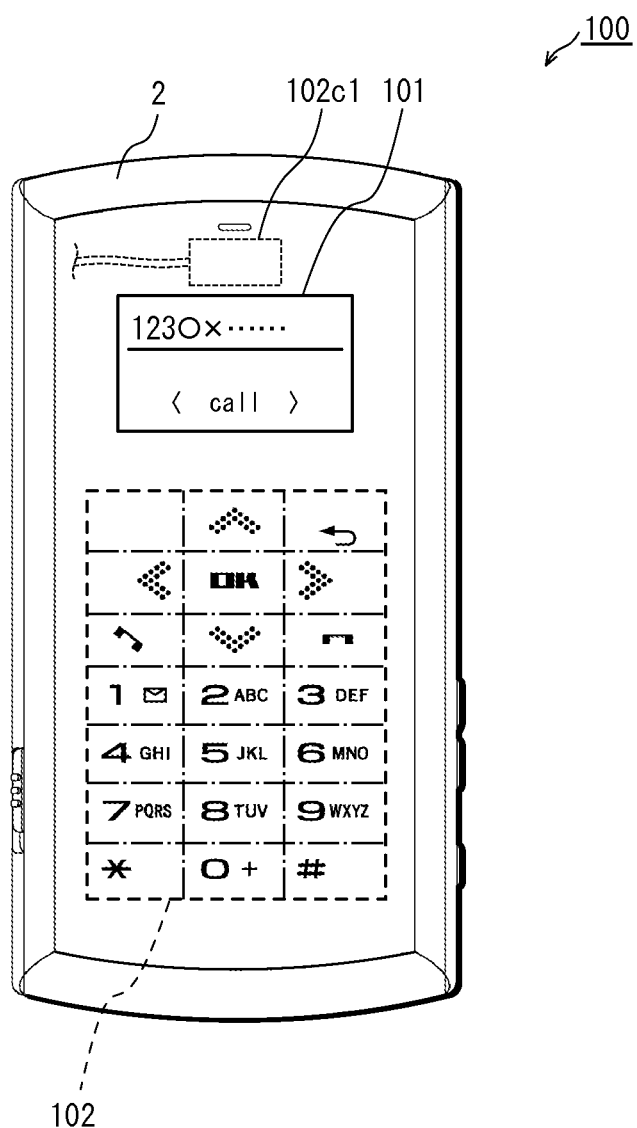
FIG. 1 is the front view showing an external representation of a mobile phone according to an embodiment.

FIG. 1 is the front view showing an external representation of a mobile phone 100 according to the embodiment.

The mobile phone 100 is of a foldable type and has a casing 2, a sub-LCD 101 and a touchpad unit 102. The sub-LCD 101 and the touchpad unit 102 are disposed on a surface of the casing 2 to be visible when the mobile phone 100 is in a folded state as shown in FIG. 1.

On the touchpad unit 102, marks representing various keys are provided to be visible. By touching the touchpad unit 102 at the location of a mark with a finger or the like, the user can cause the mobile phone 100 to execute a process allocated to the key corresponding to the mark. In addition, in the vicinity of a through hole 104a through which the sound from a speaker 105 travels, a face contact detecting key 102c3 is disposed not to be visible from the outside.

<2> Structure

Figure 2:
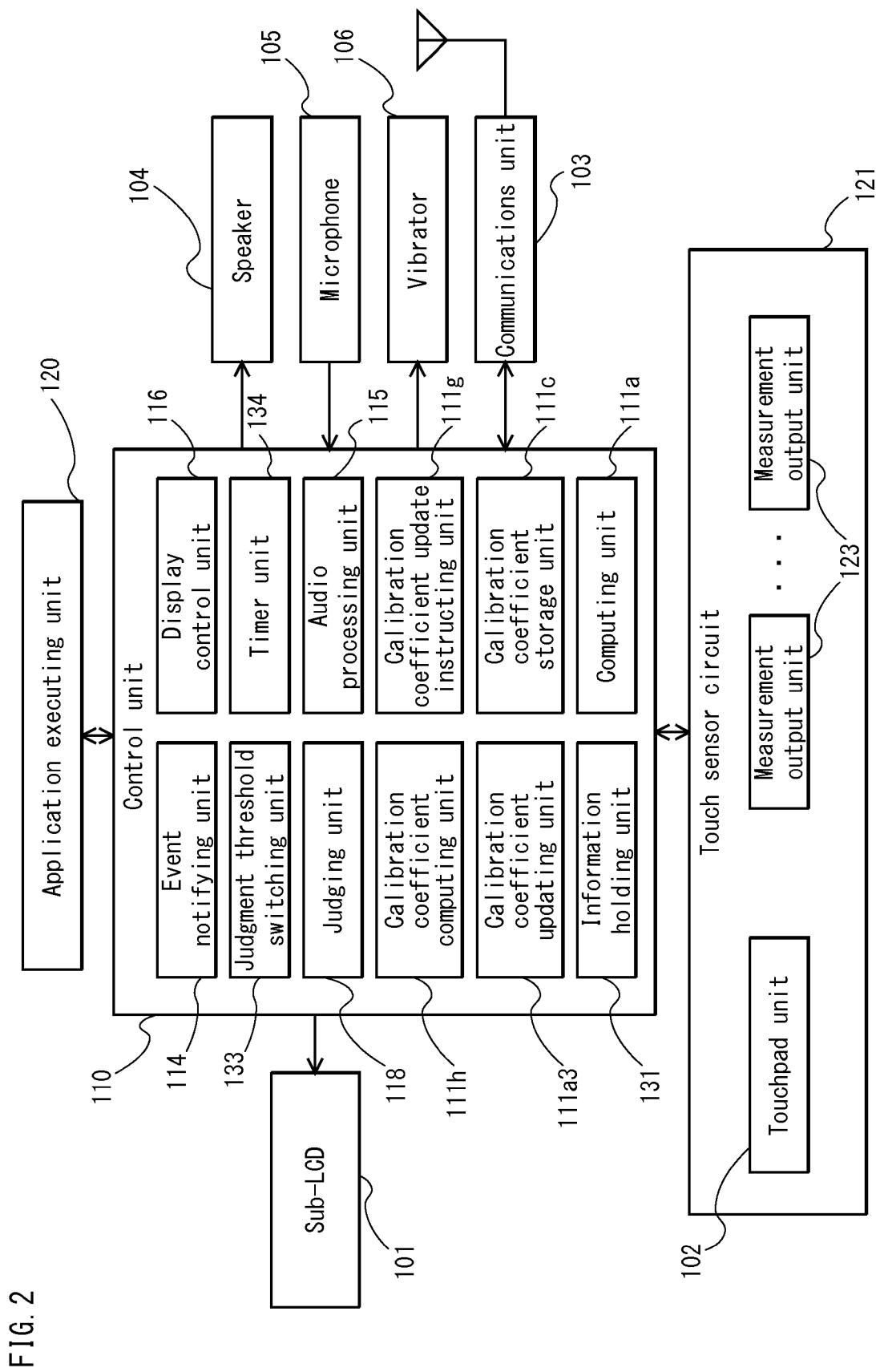
FIG. 2 is a block diagram of the mobile phone according to the embodiment.

As shown in FIG. 2, the mobile phone 100 includes the sub-LCD 101, a touch sensor circuit 121 in which the touchpad unit 102 is included, a communication unit 103, a speaker 104, a microphone 105, and a vibrator 106. In addition, the mobile phone 100 includes a processor and memory, which are not illustrated in the figures. The mobile phone 100 also includes a control unit 110 and an application executing unit 120, the respective functions of which are realized by the processor executing appropriate programs stored in the memory.

The memory includes a computation buffer (not illustrated) which is used by a calibration coefficient computing unit 111h when computing a calibration coefficient.

<2-1> Touch Sensor Circuit

The touch sensor circuit 121 includes the capacitive touchpad unit 102 and a plurality of measurement output units (output units) 123. Each output unit 123 is electrically connected to one of conductive patterns 102c2 and 102d2 drawn from the touchpad unit 102 and outputs a calibration coefficient for a measurement value of the capacitance of the touchpad unit 102.

<2-1-1> Touchpad Unit

Figure 3:
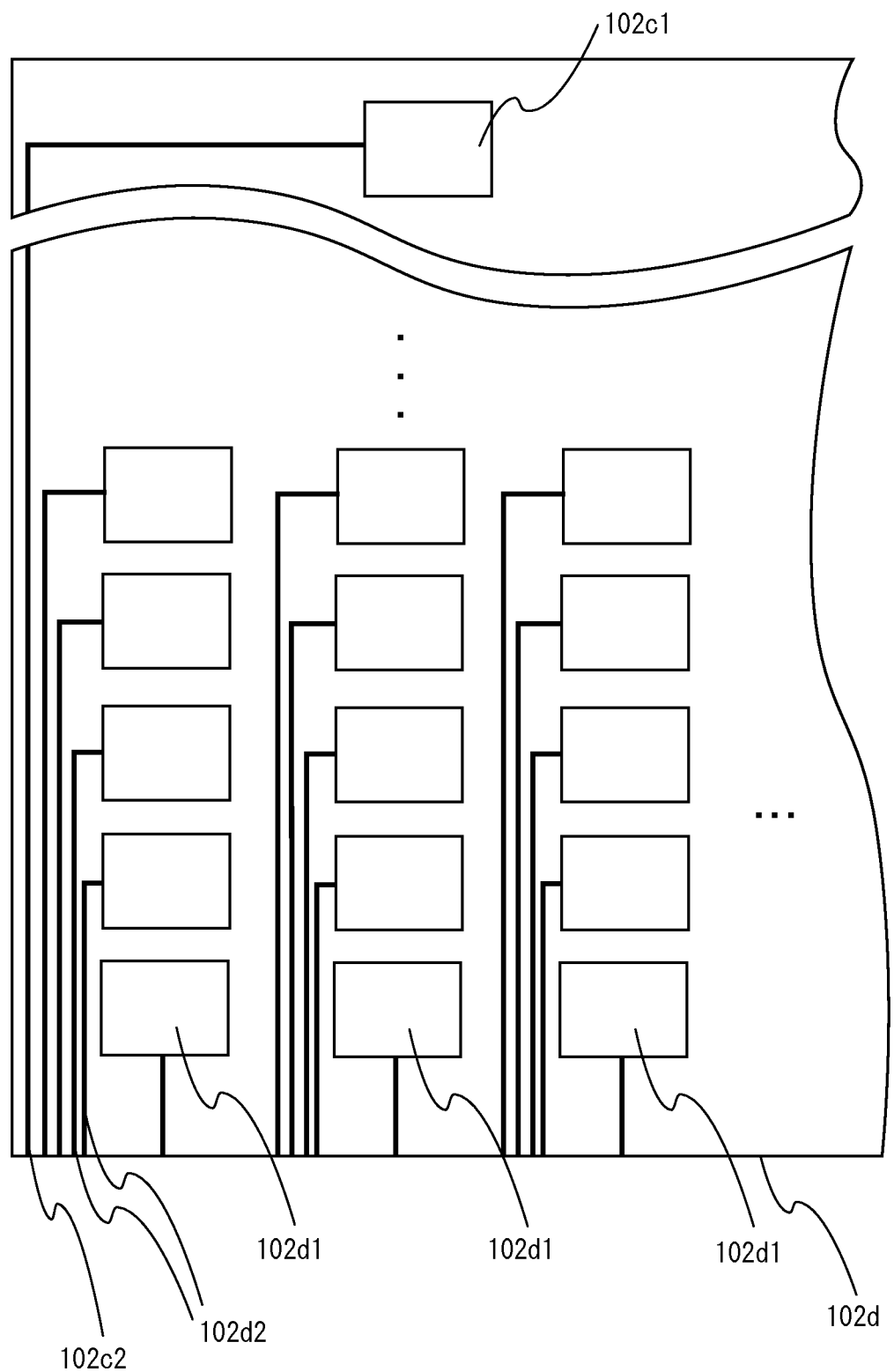
FIG. 3 is a schematic view of a touchpad unit according to the embodiment.

As shown in FIG. 3, the touchpad unit 102 includes: a rectangular substrate 102d made of a transparent material (such as glass); a plurality of electrode patterns 102d1 disposed on one of surfaces of the substrate 102d opposing in the thickness direction; and the conductive patterns 102d2 each of which is electrically connected to one of the electrode patterns 102d1. Each of the conductive patterns 102d2 is electrically connected to a corresponding one of the measurement output units 123.

In addition, an electrode pattern 102c1 for detecting a contact with the user's face is disposed on the substrate 102d at a location near a short edge of the substrate 102d. The conductive pattern 102c2 is located along a long edge of the substrate 102d and connected into the face contact detecting electrode pattern 102c1. Note that the short edge refers to an edge extending to intersect the longitudinal direction, whereas the long edge refers to an edge extending to intersect the widthwise direction. Each conductive pattern 102c2 is electrically connected at the other end to a corresponding one of the measurement output units 123.

The electrode patterns 102c1 and 102d1 as well as the conductive patterns 102c2 and 102d2 are made of a transparent conductive material such as ITO (Indium Tin Oxide).

Portions of the touchpad unit 102 corresponding to the electrode patterns 102c1 and 102d1 serve as the keys described above, including the face contact detecting key and the other keys.

<2-1-2> Measurement Output Units

Figure 4:
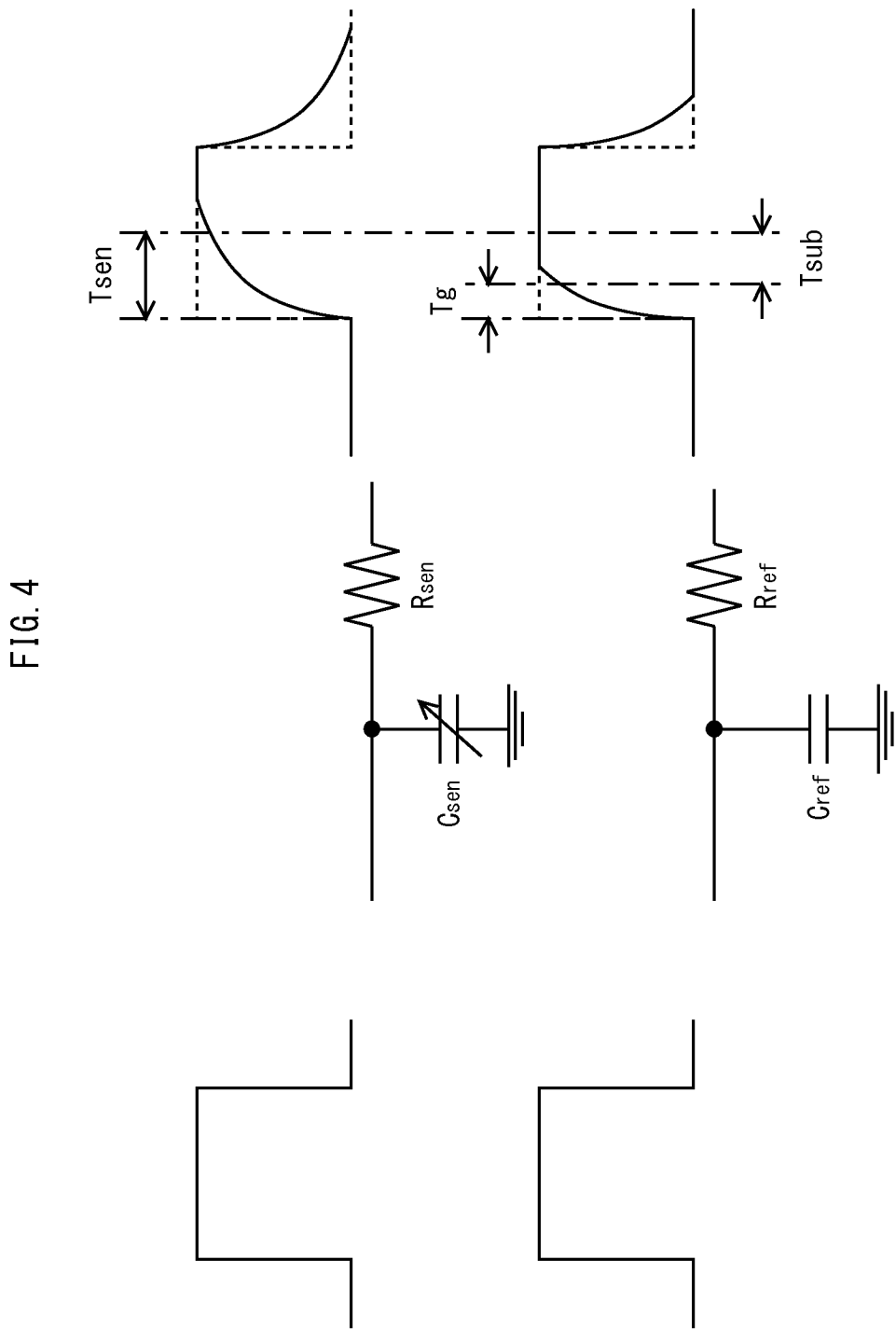
FIG. 4 is a view for explaining the operation of a touch sensor circuit according to the embodiment.

As shown in FIG. 4, each of the measurement output unit 123 includes a first counter 111b4 that measures the time constant $T_{sen}$ of an RC circuit formed by a capacitor $C_{sen}$ and a resistor $R_{sen}$ and also includes a second counter 111b8 that measures the time constant $T_g$ of an RC circuit formed by a chip capacitor $C_{ref}$ and a resistor $R_{ref}$. Each of the capacitors $C_{sen}$ is formed between a corresponding one of electrode patterns 102a1, 102b1, and 102c1 and a wall surface of the casing 2. The measurement output unit 123 outputs the difference between the time constant $T_{sen}$ and the time constant $T_{ref}$ as a measurement value.

Figure 5:
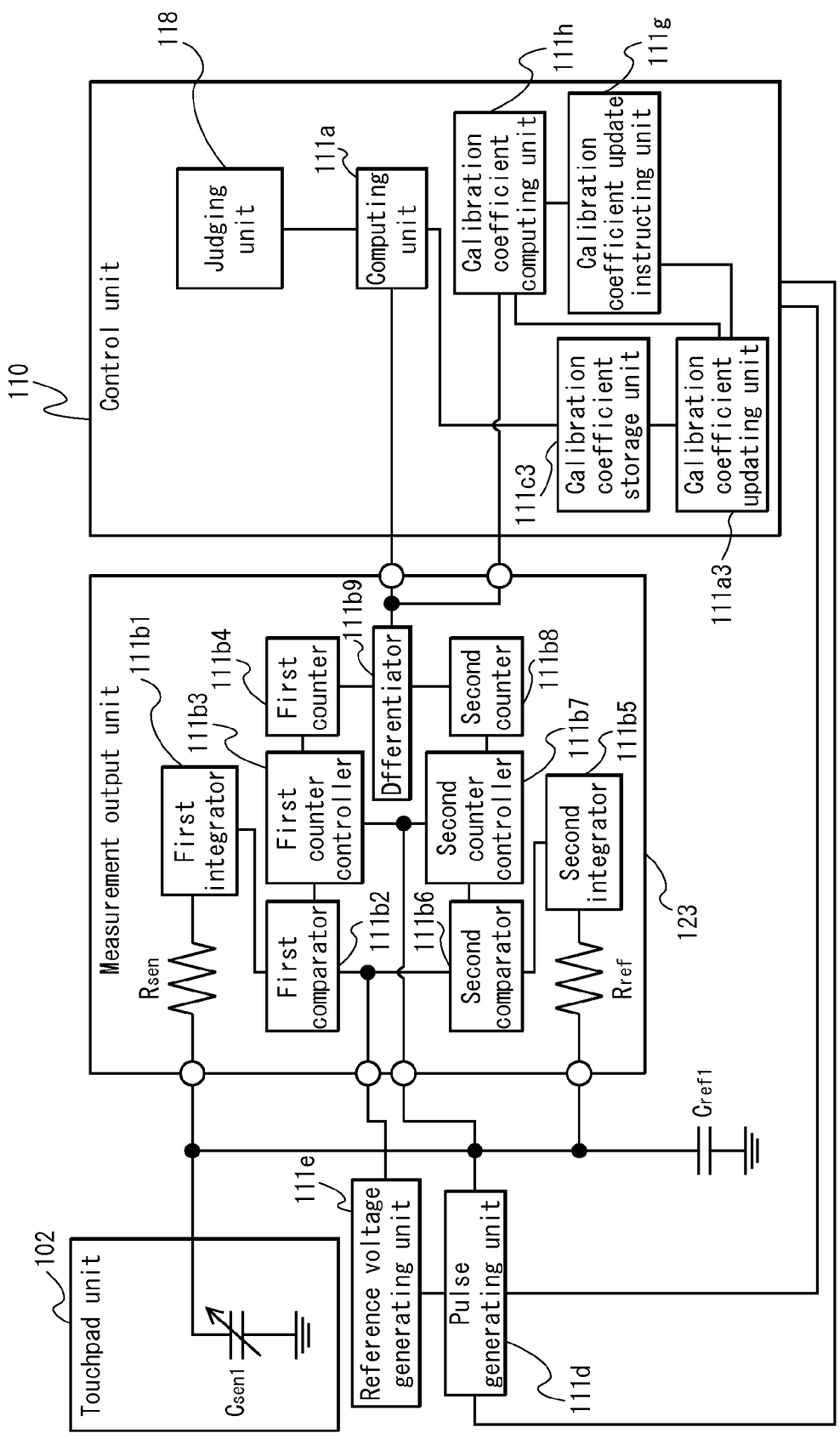
FIG. 5 is a block diagram of a measurement output unit according to the embodiment.

FIG. 5 shows the structure of one of the measurement output unit 123 in detail.

The measurement output unit 123 includes: a first integrator 111b1 that is connected to the capacitor $C_{sen}$, which is formed with a corresponding one of the electrode patterns 102d1 and 102c1, as well as to a pulse generating unit 111d both via the resistor $R_{sen}$; a first comparator 111b2 that compares the input voltages from the first integrator 111b1 and from a reference voltage generating unit 111e to output a predetermined voltage when the two input voltages are equal; a second integrator 111b5 that is connected to the reference capacitor $C_{ref}$ as well as to the pulse generating unit 111d both via the resistor $R_{ref}$; and a second comparator 111b6 that compares the input voltages form the second integrator 111b5 and from the reference voltage generating unit 111e to output a predetermined voltage if the two input voltages are equal.

In addition, the measurement output unit 123 also includes: a first counter controller 111b3 that controls, based on the input voltages from the first comparator 111b2 and from the pulse generating unit 111d, the timing for causing the first counter 111b4 to start and stop counting; a second counter controller 111b7 that controls, based on the input voltages from the second comparator 111b6 and from the pulse generating unit 111d, the timing for causing the second counter 111b8 to start and stop counting; and a differentiator 111b9 that outputs the difference between the count value of the first counter 111b4 and the count value of the second counter 111b8. Note that the reference capacitor $C_{ref}$ is disposed at a location where the heat dissipation is high in order to suppress the variations in capacitance resulting from a temperature change.

An increase in the capacitance of each capacitor $C_{sen}$ formed with one of the electrode patterns 102c1 and 102d1 of the touchpad unit 102 leads to an increase in the time constant $T_{sen}$, which results in a larger measurement value. On the contrary, a decrease in the capacitance of each capacitor $C_{sen}$ leads to a decrease in the time constant $T_{sen}$, which results in a smaller measurement value. For example, when an operating member makes contact with the touchpad unit 102, the capacitance of a relevant one of the capacitor $C_{sen}$ increases, which results in an increase in the measurement value. The variations in the capacitance of the reference capacitor $C_{ref}$ are small enough to be negligible, as compared to that of the capacitor $C_{sen}$. Therefore, the time constant $T_{ref}$ can be regarded as a constant value.

<2-2> Control Unit

In addition to the functions of a typical mobile phone, the control unit 110 functions as an OS (Operating System) that notifies the application executing unit 120 of an event containing identification information of a key determined by a key determining unit 113. The control unit 110 includes a judging unit 118, a judgment threshold switching unit 133, an event notifying unit 114, an audio processing unit 115, a display control unit 116, a computing unit 111a, a calibration coefficient computing unit 111h, a calibration coefficient update instructing unit (instructing unit) 111g, a timer unit 134, a calibration coefficient updating unit 111a3, a calibration coefficient storage unit 111c3, and an information holding unit 131 that holds identification information received from the judging unit 118.

<2-2-1> Computing Unit

The computing unit 111a corrects a measurement value input from each measurement output unit 111b using a relevant calibration coefficient stored in the calibration coefficient storage unit 111c. This process of correcting a measurement value is also called a calibration.

The computing unit 111a computes a sensor output value from a measurement value using Equation (1).

$$I(t)=Is(t)-A1 \quad \text{[Equation 1]}$$

where t denotes a time variable, I(t) denotes a sensor output value to be output from the computing unit 111a, Is(t) denotes a measurement value, and A1 denotes a calibration coefficient.

<2-2-2> Calibration Coefficient Storage Unit

The calibration coefficient storage unit 111c3 is formed by an area of memory and stores the calibration coefficient A1 used in the Equation (1). The calibration coefficient A1 is used to compute a sensor output value from a measurement value output from each measurement output unit 123 that is electrically connected to a corresponding one of the electrode patterns 102d1 and 102c1 of the touchpad unit 102.

<2-2-3> Calibration Coefficient Updating Unit

The calibration coefficient updating unit 111a3 updates the calibration coefficient A1 stored in the calibration coefficient storage unit 111c2. The calibration coefficient updating unit 111a3 updates the calibration coefficient A1 stored in the calibration coefficient storage unit 111c in a manner that the sensor output value computed at the time of receiving an instruction for updating the calibration coefficient from the control unit 110 becomes equal to a predetermined reference value. In one example, the predetermined reference value may be a center value of the range of sensor output values (i.e., to "512" when the sensor output values are up to "1024").

The calibration coefficient updating unit 111a3 computes, as the calibration coefficient A1, the difference between the sensor output value at the update time T and the predetermined reference value, by using Equation (2) below.

$$A1=Is(T)-I0 \quad \text{[Equation 2]}$$

where, T denotes the update time, and I0 denotes the predetermined reference value notified from the calibration coefficient computing unit 111h, which will be described later.

<2-2-4> Judging Unit

On receiving a timeout notification, which will be described later, from the timer unit 134, the judging unit 118 compares the sensor output value acquired from the computing unit 111a with a contact-judgment threshold. If the sensor output value exceeds the contact-judgment threshold, the judging unit 118 judges that a corresponding key (hereinafter, such a key is referred to as a "target key") is in contact with an operating member. The judging unit 118 acquires the sensor output values at a predetermined cycle (every 40 ms, for example) and notifies the event notifying unit 114 of the identification information identifying the target key specified based on the sensor output values.

On the other hand, when the sensor output value once exceeds the contact-judging threshold and subsequently falls below the noncontact-judgment threshold, the judging unit 118 judges that the touch to the target key is released. Then, the judging unit 118 checks a judgment threshold switching flag F1, which will be described later, held by the judgment threshold switching unit 133. When the judgment threshold switching flag F1 is set to "0", the judging unit 118 uses a noncontact-judgment threshold and uses a provisional noncontact-judgment threshold when the judgment threshold switching flag F1 is set to "1". Note that all of the contact-judgment threshold, noncontact-judgment threshold, and provisional noncontact-judgment threshold are stored in advance in a threshold storage area of the memory. The values of the respective thresholds are determined in advance by experiments, for example.

In addition, the judging unit 118 judges that the face contact detecting key is being touched when the sensor output value corresponding to the face contact detecting key exceeds the contact-judgment threshold. In such a case, the judging unit 118 suspends the process of notifying the event notifying unit 114 of identification information indicating any key other than the face contact detecting key. With this operation, a touch operation to any key is disabled during the time, for example, the user's face is in contact with the face contact detecting key (that is, during a phone conversation). This is effective to prevent malfunction during a phone call.

The following now describes the operation of the judging unit 118 from the time when an operating member makes a contact with a key to the time when the touch is released.

Figure 6:
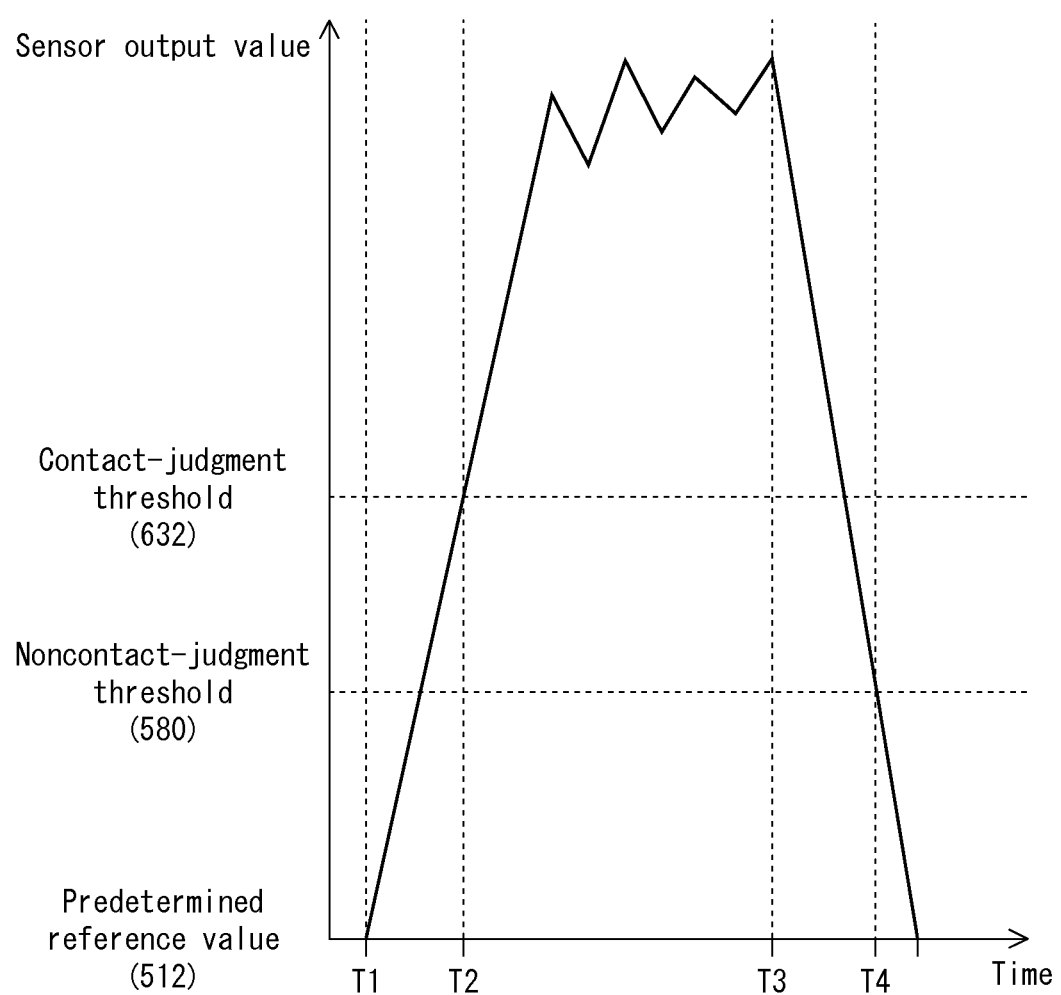
FIG. 6 is a view for explaining the operation of a control unit according to the embodiment.

In FIG. 6, the horizontal axis represents the time, whereas the vertical axis represents the sensor output value. In the figure, the range of the sensor output value from 0 to 511 is omitted. In the example shown in FIG. 6, the predetermined reference value is set to 512, the contact-judgment threshold is set to 632, and the noncontact-judgment threshold is set to 580.

The time T1 indicates the time at which the operating member makes a contact with the touchpad unit 102. As shown in FIG. 6, when the operating member makes a contact at the time T1, the sensor output value starts to increase. Then, the sensor output value exceeds the contact-judgment threshold at the time T2. At this point in time, the judging unit 118 judges that an operating member is in contact with the touchpad unit 102.

Subsequently, the sensor output value starts to decrease as the operating member starts to move away from the touchpad unit 102 at the time T3 and falls below the noncontact-judgment threshold at the time T4. At this point in time, the judging unit 118 judges that the operating member is no longer in contact with the touchpad unit 102.

<2-2-5> Calibration Coefficient Update Instructing Unit

The calibration coefficient update instructing unit 111g issues a calibration coefficient updating instruction for updating the calibration coefficient A1 stored in the calibration coefficient storage unit 111c, to the calibration coefficient computing unit 111h, the calibration coefficient updating unit 111a3, and the judgment threshold switching unit 133.

<2-2-6> Calibration Coefficient Computing Unit

On receiving the calibration coefficient updating instruction from the calibration coefficient updating instructing unit 111g, the calibration coefficient computing unit 111h notifies the calibration coefficient updating unit 111a3 of the sensor output value computed based on the measurement value that is output at the time when the calibration coefficient updating instruction is received from the measurement output unit 123.

<2-2-7> Judgment Threshold Switching Unit

The judgment threshold switching unit 133 switches from the noncontact-judgment threshold to the provisional noncontact-judgment threshold, and vice versa. The noncontact-judgment threshold and the provisional noncontact-judgment threshold are used by the judging unit 118 to detect a touch to the touchpad unit 103 made by an operating member. Here, the judgment threshold switching unit 133 holds the judgment threshold switching flag F1 and sets the judgment threshold switching flag F1 to "1" when switching from the noncontact-judgment threshold to the provisional noncontact-judgment threshold.

<2-2-8> Timer Unit

The timer unit 134 includes a timer and measures how much time has elapsed since the judging unit 118 acquires the sensor output value. The timer unit 134 issues a timeout notification upon the expiration of a predetermined time period.

<2-2-9> Information Holding Unit

The information holding unit 131 is implemented as an area of the memory and stores identification information of the target key written by the judging unit 118. Here, the judging unit 118 writes identification information of a target key each time a sensor output value is acquired.

<2-2-10> Event Notifying Unit

The event notifying unit 114 notifies the application executing unit 120 of event occurrence information that contains the identification information received from the judging unit 118. In addition, the event notifying unit 114 reads identification information of a target key from the information holding unit 131 if there is an event notification being processed when the sensor output value falls below the noncontact-judgment threshold upon the calibration coefficient update and notifies the application executing unit 120 of the event occurrence information that contains the identification information thus read.

<2-2-11> Others

The sub-LCD 101 displays images of characters and the like under the control by the control unit 110.

The communication unit 103 is a circuit that transmits radio waves to and from a base station via an antenna. The communication unit 103 passes a reception signal to the control unit 110 after demodulation and transmits a signal passed from the control unit 110 after modulation.

The audio processing unit 115 carries out D/A (Digital/Analog) conversion of an audio signal received via the communication unit 103 to output the resulting signal from the speaker 104 and also carries out A/D (Analog/Digital) conversion of an audio signal input from the microphone 105 to transmit the resulting signal via the communication unit 103. Note that the audio signals mentioned above include DTMF (Dial Tone Multi Frequency) tones.

The display control unit 116 controls the sub-LCD 101 to display images and the like, by following instructions from the application executing unit 120.

The application executing unit 120 executes an appropriate application according to the event occurrence information received from the control unit 110.

<3> Operation

<3-1> Overall Operation

Figure 7:
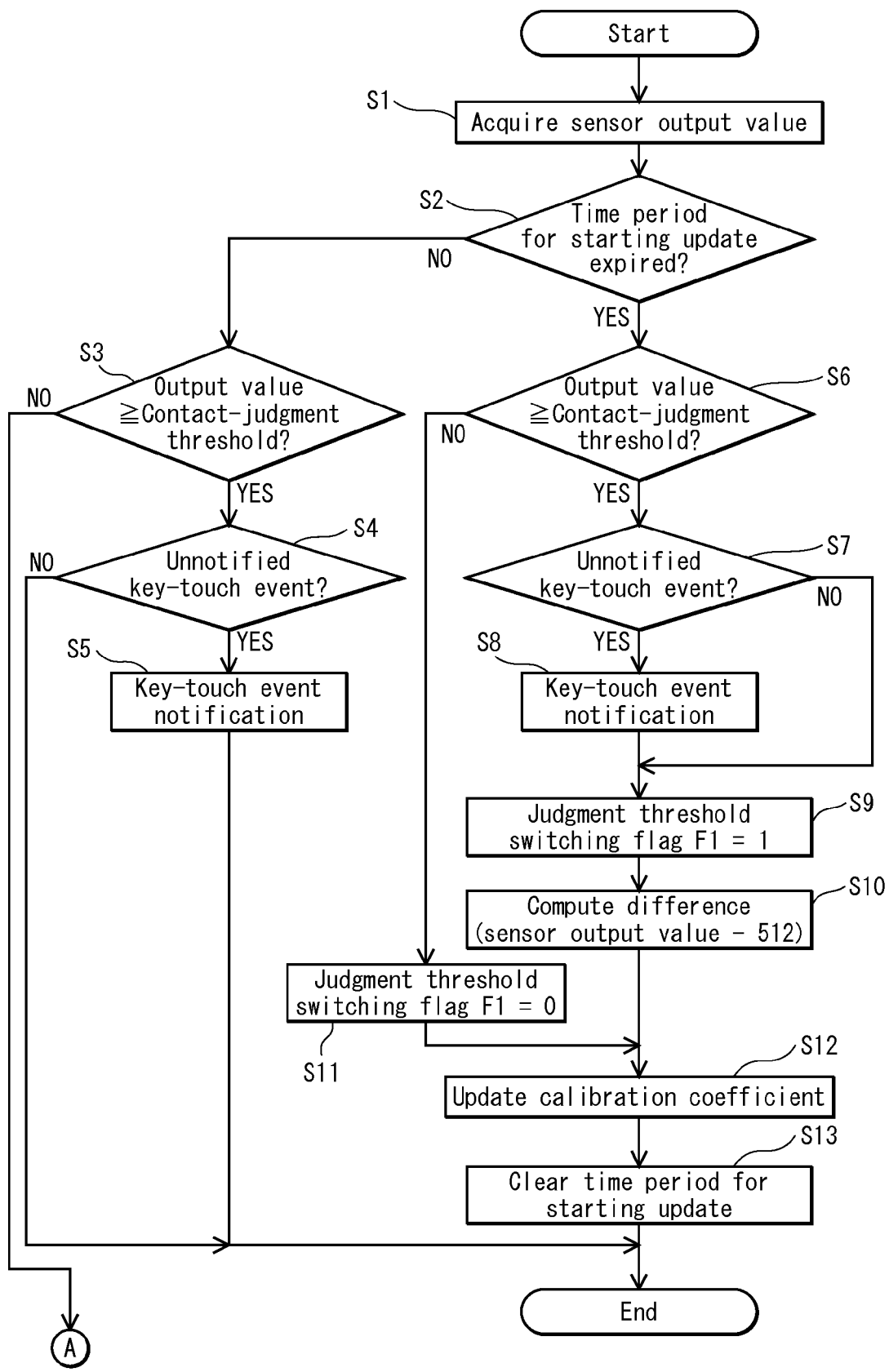
FIG. 7 is a flowchart of the operation of the mobile phone according to the embodiment.
Figure 8:
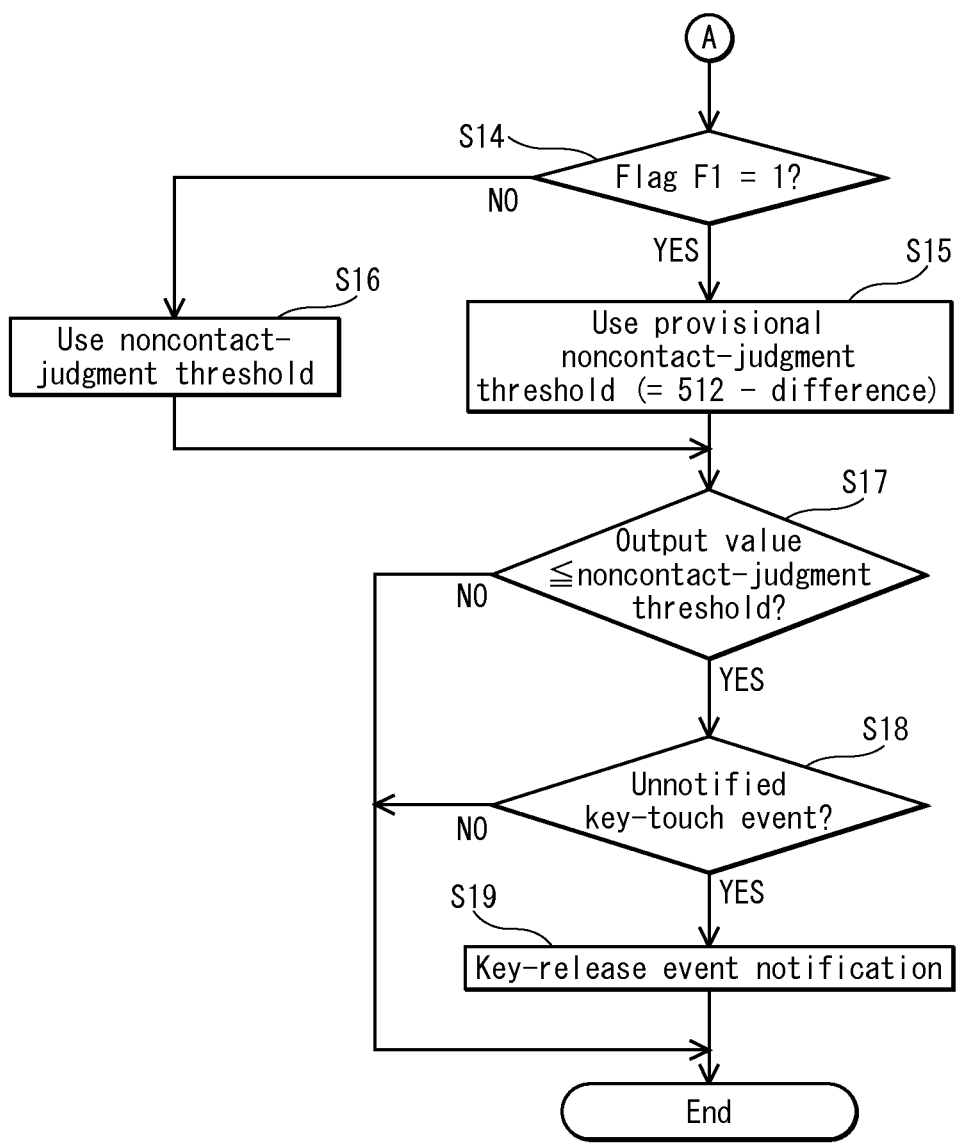
FIG. 8 is a flowchart of the operation of the mobile phone according to the embodiment.

FIGS. 7 and 8 show a flowchart of the operation of the mobile phone 100 according to the embodiment.

First, the judging unit 118 acquires sensor output values each computed based on a measurement value output from the touch sensor circuit 121 (Step S1). Note that the judging unit 118 cyclically (every 40 ms, for example) acquires the sensor output value output from the computing unit 111a.

Thereafter, the timer unit 134 judges whether the condition for starting the calibration coefficient update process is met (Step S2). Note the condition is met upon the expiration of the predetermined time period.

When the timer unit 134 judges in Step S2 that the predetermined time period has passed and thus the condition for starting the calibration coefficient update process is met (Step S2: YES), the judging unit 118 judges whether the sensor output value is equal to or greater than the contact-judgment threshold (Step S6).

When judging in Step S6 that the sensor output value is smaller than the contact-judgment threshold (Step S6: NO), the judging unit 118 sets the judgment threshold switching flag F1 to "0" (Step S11). Then, the processing moves on to Step S12, which will be described later.

On the other hand, when judging in Step S6 that the sensor output value is equal to or greater than the contact-judgment threshold (Step S6: YES), the judging unit 118 notifies the event notifying unit 114 of the situation. In response, the event notifying unit 114 judges whether event occurrence information that contains the identification information received from the judging unit 118 has already been issued to the application executing unit 120 (that is, whether the key touch event has been notified to the application executing unit) (Step S7).

On judging in Step S7 that the key touch event has not been notified yet, the event notifying unit 114 notifies the application executing unit 120 of the key touch event (Step S8). Also, if the key touch event has not been notified yet, the processing moves onto Step S9.

Subsequently, the judgment threshold switching unit 133 sets the judgment threshold switching flag F1 to "1" (Step S9).

Next, the calibration coefficient computing unit 111h computes, as the calibration coefficient A1, the difference between the sensor output value and the predetermined reference value (which is "512" in this embodiment) (Step S10).

Figure 9:
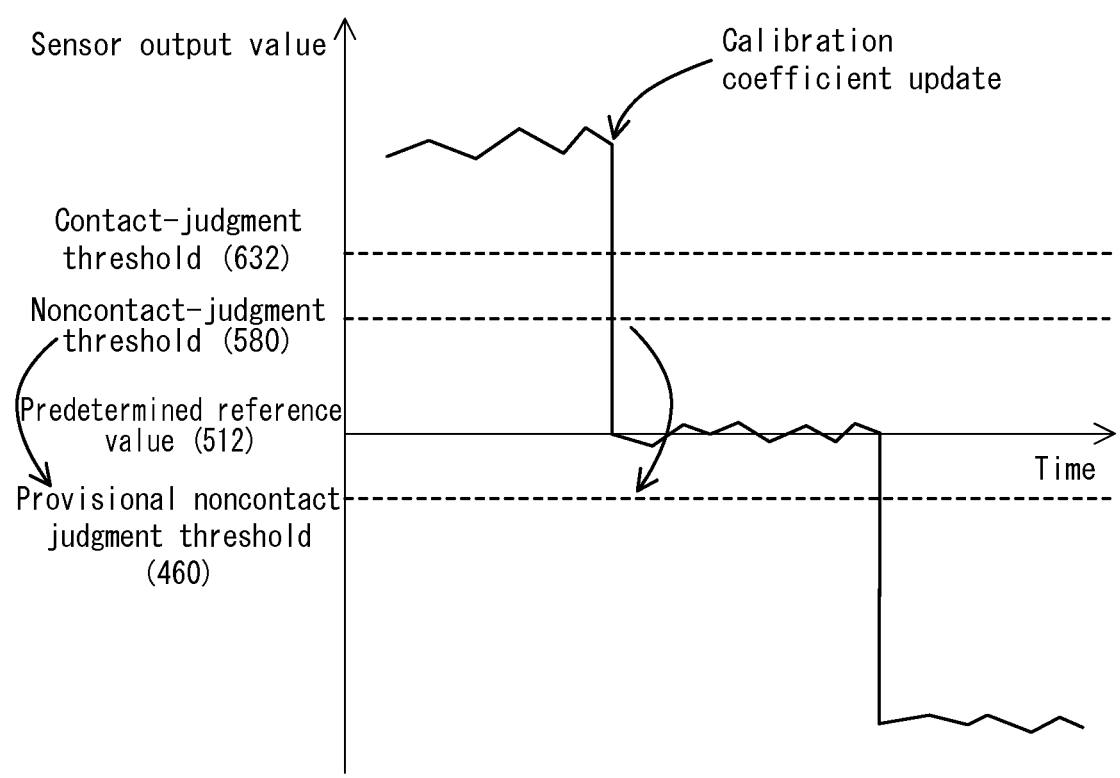
FIG. 9 is a view for explaining the operation of the mobile phone according to the embodiment.

Then, the calibration coefficient update instructing unit 111g issues a calibration coefficient updating instruction to the calibration coefficient updating unit 111a3 and, in response, the calibration coefficient updating unit 111a3 updates the calibration coefficient A1 stored in the calibration coefficient storage unit 111c (Step S12). As a result of this step, the calibration coefficient updating unit 111a3 updates the calibration coefficient A1 in a manner that with the updated calibration coefficient A1, the sensor output value is calibrated to the value equal to the predetermined reference value as shown in FIG. 9.

Subsequently, the timer unit 134 clears the passage of time having been measured to determine the timing for the calibration coefficient update (Step S13).

On the other hand, when the timer unit 134 judges in Step S2 that the predetermined time period has not passed yet and thus the condition for starting the calibration coefficient update process has not been met yet (Step S2: NO), the judging unit 118 then judges whether the sensor output value is equal to or greater than the contact-judgment threshold (Step S3).

When the judging unit 118 judges in Step S3 that the sensor output value is equal to or greater than the contact-judgment threshold, the event notifying unit 114 judges whether event occurrence information generated from the identification information received from the judging unit 118 has already been issued to the application executing unit 120 (that is, whether the key touch event has been notified to the application executing unit) (Step S4).

On judging in Step S4 that the key touch event has not been notified yet, the event notifying unit 114 notifies the application executing unit 120 of the key touch event (Step S5). Also, if the key touch event has not been notified yet, the processing ends without any further steps.

In Step S3, when the judging unit 118 judges that the sensor output value is smaller than the contact-judgment threshold (Step S3: NO), the judgment threshold switching unit 133 judges whether the judgment threshold switching flag F1 is set to "1" or not (Step S14).

On judging in Step S14 that the judgment threshold switching flag F1 is not set to "1" (Step S14: No), the judgment threshold switching unit 133 leaves the noncontact-judgment threshold unchanged (Step S16).

On the other hand, when it is judged in Step S14 that the judgment threshold switching flag F1 is set to "1" (Step S14: YES), the judgment threshold switching unit 133 then switches the noncontact-judgment threshold to the difference between the predetermined reference value "512" and the sensor output value computed by the calibration coefficient computing unit 111h (that is, the difference is equal to the value equal to the calibration coefficient A1) (Step S15).

Next, the judging unit 118 judges whether the sensor output value is equal to or smaller than the noncontact-judgment threshold (Step S17).

When the judging unit 118 judges in Step S17 that the sensor output value exceeds the noncontact-judgment threshold (Step S17: NO), the processing ends without any further steps.

On the other hand, when the judging unit 118 judges in Step S17 that the sensor output value is equal to or smaller than the noncontact-judgment threshold (Step S17: YES), the event notifying unit 114 judges whether the key touch event has been notified (Step S18).

When the event notifying unit 114 judges in Step S18 that the key touch event has not been notified yet (Step S18: NO), the processing ends without any further steps.

On the other hand, on judging in Step S18 that the key touch event has been notified to the application executing unit 120 (Step S18: YES), the event notifying unit 114 then notifies the application executing unit 120 of a key release event (i.e., an event occurring when the target key is released) (Step S19). Then the processing ends.

Figure 10A:
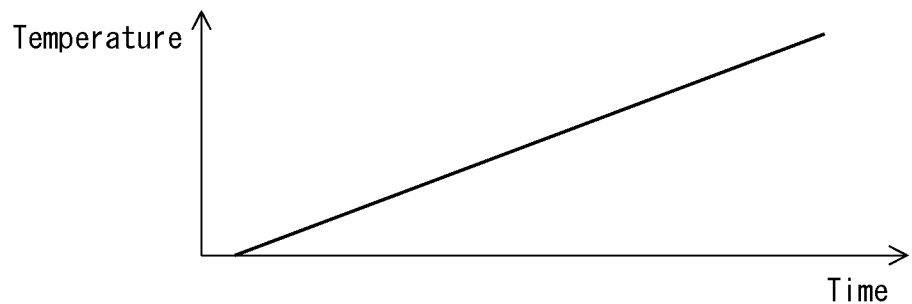
FIGS. 10A, 10B, and 10C are views for explaining the operation of the mobile phone according to the embodiment.
Figure 10B:
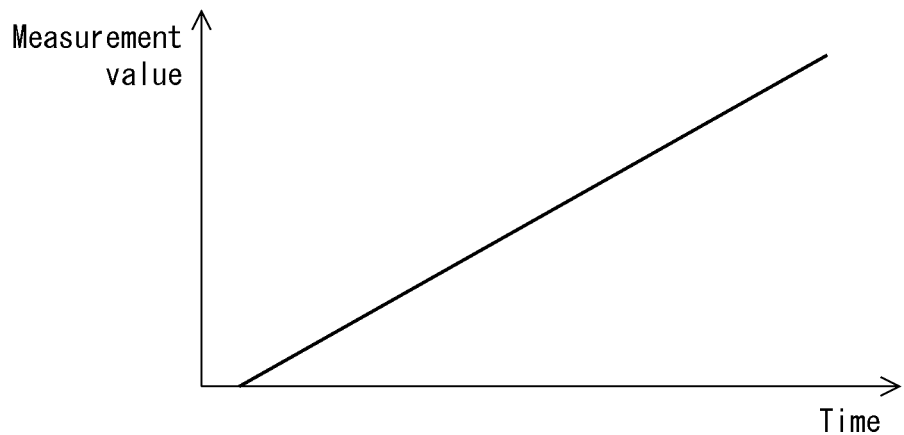
Figure 10C:
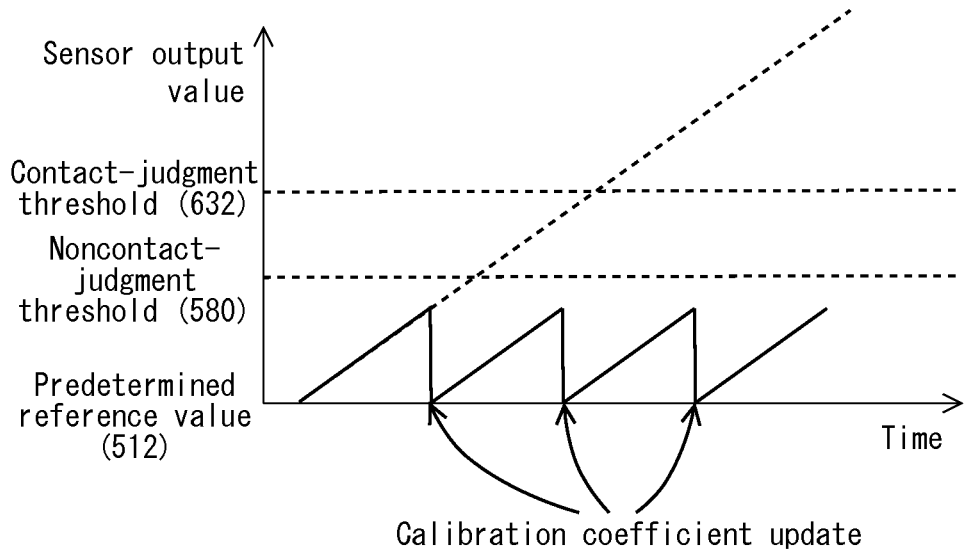

Through the above steps, even if the ambient temperature of the touchpad unit 102 elevates (see FIG. 10A) and the temperature rise results in that measurement values output from the measurement output unit 123 are higher than otherwise they would be (see FIG. 10B), the calibration coefficient A1 is updated at regular intervals (every 40 ms, for example) (see FIG. 10C). Owing to the calibration coefficient A1 being regularly updated, it is duly avoided that the sensor output values exceed the contact-judgment threshold although the touchpad unit 102 is not in contact with any operating member.

<Modifications>

Up to this point, the mobile terminal according to the present invention has been described by way of the specific embodiment. However, it goes without saying that various modifications including the following are duly possible and the present invention is not limited to the mobile phone described above in the specific embodiment.

(1) In the above embodiment, the judging unit 118 uses the provisional noncontact-judgment threshold if the judgment threshold switching flag F1 is set to "1". However, this is merely one example and without limitation. For example, it is applicable to switch from the provisional noncontact-judgment threshold back to the noncontact-judgment threshold when the sensor output value equal to a predetermined value or larger is output after the noncontact-judgment threshold is switched to the provisional noncontact-judgment threshold.

Figure 11A:
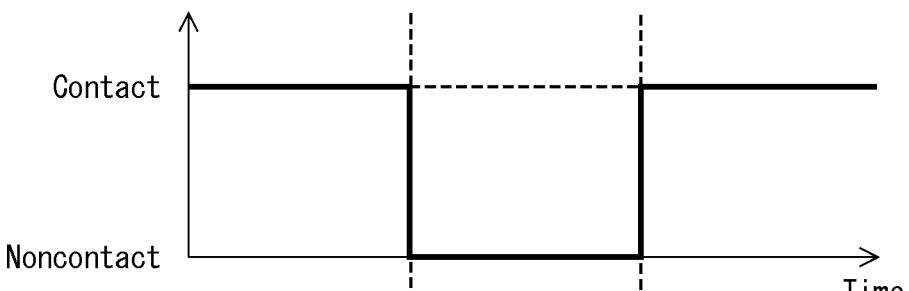
FIGS. 11A, 11B, and 11C are views for explaining the operation of a mobile phone according to a modification.
Figure 11B:
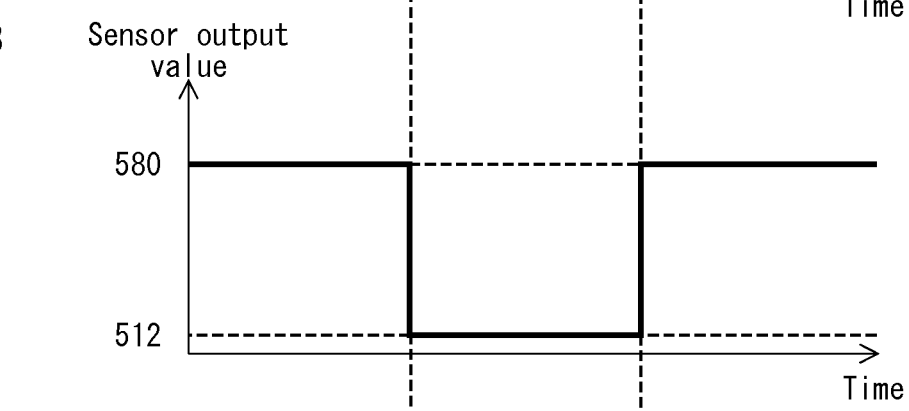
Figure 11C:
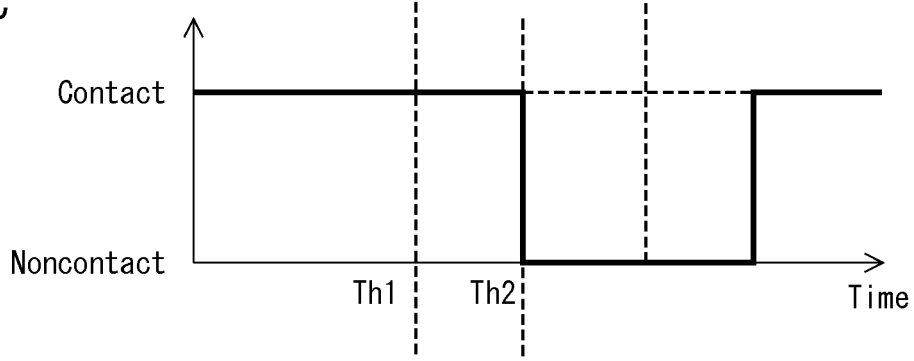

In the above embodiment, it is presumed that the calibration coefficient A1 is updated using either a sensor output value that is output when the touchpad unit is in contact with an operating member or a sensor output value that is output when the touch pad unit is not in contact with an operating member. However, as shown in FIG. 11, there may be a time lag between the time-varying change of the actual sensor output value and the time-varying change of the sensor output value recognized by the judging unit 118. That is, there may be a case where the calibration coefficient A1 is updated at the time when the judging unit 118 judges that an operating member is currently in contact with the touchpad unit 102 but actually the operating member has already been moved away from the touchpad unit 102 (for example, between the time Th1 and Th2 shown in FIG. 11). The consequence is that the judgment threshold switching unit 133 switches from the noncontact-judgment threshold to the provisional contact-judgment threshold (for example, "480" which is smaller than the predetermined reference value "512") despite that the calibration coefficient A1 is computed under the state where the operating member is not in contact with the touchpad unit 102.

As a consequence, the calibration coefficient is updated so that the sensor output value is commuted to be equal to "512", which is the predetermined reference value taken under the state where the operating member is not in contact with the touchpad unit 102. This means that the sensor output value never falls below the provisional noncontact-judgment threshold, which makes it impossible to detect removable of the operating member from the touchpad unit 102.

According to this modification, however, the provisional noncontact-judgment threshold is switched back to the noncontact-judgment threshold if the sensor output value obtained by the judgment threshold switching unit 133 after switching from the noncontact-judgment threshold to the provisional noncontact-judgment threshold is equal to or greater than a predetermined value (hereinafter, referred to as the second reference value) of "580", for example.

Figure 12:
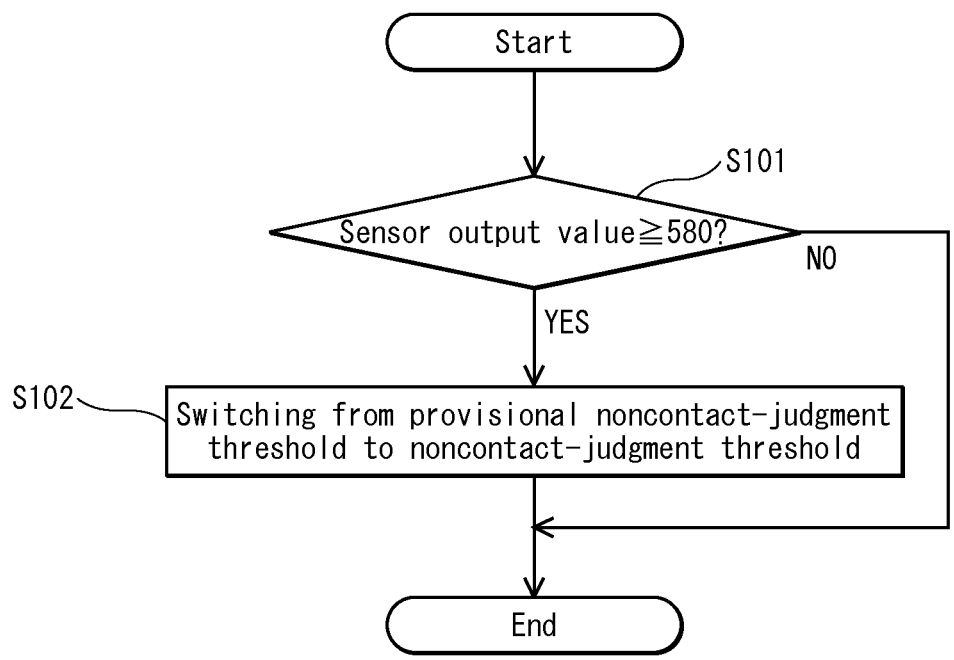
FIG. 12 is a flowchart of the operation of the mobile phone according to the modification.

FIG. 12 is a flowchart of the operation of the mobile phone according to the modification.

The following description is given on the precondition that the second reference value is set to "580".

First, the judging unit 118 acquires a sensor output value from the computing unit 111a and judges whether the sensor output value is equal to or greater than "580" that is the second reference value (Step S101).

In Step S101, the judging unit 118 judges that the sensor output value is smaller than the second reference value of "580" and notifies the judgment threshold switching unit 133 of the situation. In response, the judgment threshold switching unit 133 ends the process without switching to the provisional noncontact-judgment threshold.

On the other hand, when judging in Step S101 that the sensor output value is equal to or greater than the second reference value of "580", the judging unit 118 notifies the judgment threshold switching unit 133 of the situation. In response, the judgment threshold switching unit 133 switches from the provisional noncontact-judgment threshold to the noncontact-judgment threshold (Step S102) and then processing ends.

Through the above processing steps, it is ensured that the judgment threshold switching unit 133 changes the noncontact-judgment threshold to an appropriate value. Consequently, it duly is avoided that the removal of the operating member from the touchpad unit 102 cannot be detected.

(2) According to the above embodiment, when a calibration coefficient update instruction is received from the calibration coefficient update instructing unit 111g, the calibration coefficient computing unit 111h outputs the sensor output value that is computed at the time when the calibration coefficient update instruction is received. However, this is merely an example and without limitation. For example, it is applicable that calibration coefficient computing unit 111h outputs the average of a predetermined number of sensor output values sampled up to the time at which the calibration coefficient update instruction is received from the calibration coefficient update instructing unit 111g.

Since the average value is used according to this modification, the accuracy of the sensor output value is further enhanced.

(3) According to the above embodiment, the sensor output values from the measurement output units become higher when an operating member is in contact with the touchpad unit 102. However, this is merely an example and without limitation. For example, the present invention is applicable to the case where the sensor output values from the measurement output unit 123 become lower when an operating member is in contact with the touchpad unit 102.

(4) The mobile phone described in the above embodiment may be of any type as long as the mobile phone is provided with a touchpad unit. For example, the mobile phone may be of a foldable type along a long side or along a short side, a non-foldable type, a slidable, type, and so on.

(5) According to the above embodiment, the sub-LCD 101 and the touchpad unit 102 are described as two separate components. However, the sub-LCD 101 and the touchpad unit 102 may be combined into one component that functions as both, i.e., a so-called touch panel.

That is, one touch panel may function as both the operating portion and the display portion for displaying a numeral, character, or the like input by a touch operation. Alternatively, the operating portion used to input a numeral or character may be implemented by a touch panel and the display portion used for displaying an input numeral, character, or the like may be implemented by an LCD, organic EL (Electro-Luminescence), or the like.

In addition, the touchpad unit is not limited to the type that employs an LCD capable of displaying images to present characters and the like. Alternatively, the touchpad unit may be a combination of an illuminator and a sheet having transmitting parts each in a shape of a character or mark disposed over the illuminator. In this alternative configuration, the user may touch the sheet at a location corresponding to the transmitting part having the shape of a desired character. In response, a change is caused in the capacitance of the touchpad unit, so that the desired character is input.

(6) In the above embodiment, the predetermined reference value is set to "512", the noncontact-judging threshold is set to "580", and the contact-judging threshold is set to "632", but these values are merely examples and without limitations. In addition, although the touchpad unit is not in contact with any operating member, the sensor output value varies due to noise resulting from the operations of the various function units used for placing a call or actuating a camera function. It is therefore preferable to carry out measurements in advance see how much the sensor output values and key contact values increase during the time of a phone conversation or a picture-taking operation and determine the values of the noncontact-judging threshold and contact-judging threshold based on the measurements.

(7) Part or entirety of the touch sensor circuit according to the embodiment may be implemented by an integrated circuit composed of a single-chip or a plurality of chips. The control unit 110 according to the embodiment described above may be implemented by a computer program alone or by a combination of a plurality of chips constituting an integrated circuit.

(8) To implement the control unit 110 described in the above embodiment, the program for causing the CPU to run may be distributed via recording mediums or via various communication channels. Examples of such recording mediums include IC card, optical disc, flexible disc, ROM, and flash memory. The program distributed may be stored onto memory readable by a CPU included in a device to be available for use. The functionally of the control unit 110 described in the above embodiment is realized by the CPU executing the program.

<Supplemental>

(1) A mobile phone according to an embodiment is provided with a capacitive touchpad 102 and includes: a touch sensor circuit 121 that outputs a measurement value indicating a capacitance for the touchpad unit 102; a computing unit 111a that computes a sensor output value by correcting a measurement value output from the touch sensor circuit by using a calibration coefficient; a calibration coefficient updating unit 111a3 that updates the calibration coefficient when an update instruction for updating the calibration coefficient is received from an external source, so that the sensor output value computed by using the updated calibration coefficient becomes equal to a predetermined reference value; a judging unit 118 that judges that an operating member is in contact with the touchpad unit 102 when a sensor output value computed before the update of the calibration coefficient is greater than a contact-judgment threshold, and that the operating member is no longer in contact with the touchpad unit 102 when a sensor output value falls below a noncontact-judgment threshold for the first time after the judgment that the operating member is in contact with the touchpad unit 102 is made; and a judgment threshold switching unit 133 that switches from the noncontact-judgment threshold to be used in a subsequent judgment by the judging unit to a provisional noncontact-judgment threshold for a time period starting when the update of the calibration coefficient takes place while the operating member is in contact with the touchpad unit 102 and ending when the judging unit 118 judges that the operating member is no longer in contact with the touchpad unit 102.

With this configuration, when the calibration coefficient updating unit 111a3 updates the calibration coefficient in the state where the touchpad unit 102 is in contact with the user's face, the judgment threshold switching unit 133 causes the judging unit 118 to make a judgment with the use of the provisional noncontact-judging threshold. That is, the judging unit 118 is enabled to properly judge whether the touchpad unit 102 is in contact with part of the user's face and therefore the calibration coefficient is updated at short intervals even if the touchpad unit 102 is in contact with the user's face for a long period of time. Consequently, the influence on changes of the capacitance resulting from the temperature change is suppressed, which leads to prevention of malfunction resulting from the temperature change of the touchpad unit 102.

(2) The mobile telephone according to the embodiment may further include: a calibration coefficient update instructing unit 111g that repeatedly issues an update instruction for updating the calibration coefficient to the calibration coefficient updating unit; and a calibration coefficient storage unit 111c for storing the calibration coefficient. The calibration coefficient updating unit 111a3 carries out the update so that the sensor output value computed based on the measurement value that is output at a time when the update instruction from the calibration coefficient update instructing unit 111g is received results in a value equal to the reference value.

With the provision of the calibration coefficient storage unit 111c for storing a calibration coefficient, the predetermined reference value for sensor output values is easily changed simply by the calibration coefficient updating unit 111a3 updating the calibration coefficient stored in the calibration coefficient storage unit 111c.

(3) The mobile telephone according to the embodiment may further include a timer unit 134 that measures a time period having passed after the judging unit 118 receives the sensor output value. The calibration coefficient update instructing unit 111g issues the instruction to update the calibration coefficient when the measured time period reaches a predetermined time period.

With this configuration, even during the time that the touchpad unit 102 remains in contact with an operating member, the calibration coefficient update instructing unit 111g issues an instruction for updating the calibration coefficient. This leads to that the calibration coefficient is reliably updated even under the state where the touchpad unit 102 is in contact with the operating member for a long time, so that malfunction resulting from temperature change of the touchpad unit 102 is prevented.

INDUSTRIAL APPLICABILITY

The mobile terminal according to the present invention is usable for the cases where a user makes operation with the touchpad unit.

REFERENCE SIGNS LIST 1, 2 casing
3 input key
4 LCD
100 mobile phone
101 sub-LCD
102 touchpad unit
103 communications unit
104 speaker
105 microphone
106 vibrator
110 control unit
111a computing unit
111a3 calibration coefficient updating unit (updating unit)
111c calibration coefficient storage unit (storage unit)
111g calibration coefficient update instructing unit (update instructing unit)
111h calibration coefficient computing unit
114 event notifying unit
115 audio processing unit
116 display control unit
120 application executing unit
121 touch sensor circuit
123 measurement output unit (output unit)
133 judgment threshold switching unit
134 timer unit

The invention claimed is:

1. A mobile terminal comprising:
a touch sensor circuit that includes a capacitive touchpad unit and outputs a measurement value indicating a capacitance for the touchpad unit;
a computing unit that computes a sensor output value based on the measurement value output from the touch sensor circuit;
an updating unit that updates the sensor output value so as to be equal to a predetermined reference value when the updating unit receives an update instruction;
a judging unit that judges that
an operating member is in contact with the touchpad unit when a sensor output value is greater than a contact-judgment threshold, and
the operating member is no longer in contact with the touchpad unit when a sensor output value falls below a noncontact-judgment threshold for a first time after the judgment that the operating member is in contact with the touchpad unit; and
a judgment threshold switching unit that switches from the noncontact-judgment threshold to be used in a subsequent judgment by the judging unit to a provisional noncontact-judgment threshold for a time period starting when the update takes place while the operating member is in contact with the touchpad unit and ending when the judging unit judges that the operating member is no longer in contact with the touchpad unit, and switches from the provisional noncontact-judgment threshold back to the noncontact-judgment threshold after the time period.

2. The mobile terminal according to claim 1, further comprising:
an update instructing unit that issues an update instruction to the updating unit, wherein
the update unit carries out the update so that the sensor output value based on the measurement value output at a time when the update unit receives the update instruction from the update instructing unit is computed to be equal to the reference value.

3. The mobile terminal according to claim 2, further comprising:
a timer unit that measures a time period having passed after the judging unit receives the sensor output value,
wherein the update instructing unit issues the update instruction when the measured time period reaches a predetermined time period.

4. The mobile terminal according to claim 1, wherein the judgment threshold switching unit switches from the provisional noncontact-judgment threshold back to the noncontact-judgment threshold when a sensor output value computed by the computing unit after switching from the noncontact-judgment threshold to the provisional noncontact-judgment threshold is equal to or greater than a predetermined value.

5. A method for controlling a mobile terminal that includes a touch sensor circuit, the touch sensor circuit including a capacitive touchpad unit and outputting a measurement value indicating a capacitance for the touchpad unit, the method comprising:
a calibration step of computing a sensor output value by calibrating, with a calibration coefficient, a measurement value output from the touch sensor circuit;
an updating step of updating the calibration coefficient when an update instruction is received from an external source, so that the sensor output value computed with the updated calibration coefficient in the calibration step becomes equal to a predetermined reference value;
a judging step of judging that
an operating member is in contact with the touchpad unit when a sensor output value computed before the update of the calibration coefficient is greater than a contact-judgment threshold, and the operating member is no longer in contact with the touchpad unit when a sensor output value falls below a noncontact-judgment threshold for a first time after the judgment that the operating member is in contact with the touchpad unit; and a judgment threshold switching step of switching from the noncontact-judgment threshold to be used in a subsequent judgment in the judging step to a provisional noncontact-judgment threshold for a time period starting when the update takes place while the operating member is in contact with the touchpad unit and ending when the judgment that the operating member is no longer in contact with the touchpad unit is made in the judging step, and switching from the provisional noncontact-judgment threshold back to the noncontact-judgment threshold after the time period.

6. A non-transitory computer-readable storage medium having a control program for causing a computer to control a mobile terminal that includes a touch sensor circuit, the touch sensor circuit including a capacitive touchpad unit and outputting a measurement value indicating a capacitance for the touchpad unit, the program comprising code operable to cause the computer to perform:

a calibration step of computing a sensor output value by calibrating, with a calibration coefficient, a measurement value output from the touch sensor circuit;

an updating step of updating the calibration coefficient when an update instruction is received from an external source, so that the sensor output value computed with the updated calibration coefficient in the calibration step becomes equal to a predetermined reference value;

a judging step of judging that an operating member is in contact with the touchpad unit when a sensor output value computed before the update of the calibration coefficient is greater than a contact-judgment threshold, and the operating member is no longer in contact with the touchpad unit when a sensor output value falls below a noncontact-judgment threshold for a first time after the judgment that the operating member is in contact with the touchpad unit; and a judgment threshold switching step of switching from the noncontact-judgment threshold to be used in a subsequent judgment in the judging step to a provisional noncontact-judgment threshold for a time period starting when the update takes place while the operating member is in contact with the touchpad unit and ending when the judgment that the operating member is no longer in contact with the touchpad unit is made in the judging step, and switching from the provisional noncontact-judgment threshold back to the noncontact-judgment threshold after the time period.

7. The mobile terminal according to claim 1, wherein the judgment threshold switching unit calculates the provisional noncontact-judgment threshold based on the sensor output value.

8. The mobile terminal according to claim 7, wherein calculating the provisional noncontact-judgment threshold comprises subtracting the sensor output value from the predetermined reference value.

9. The mobile terminal according to claim 1, wherein the predetermined reference value is a center value of a range of possible sensor output values.

10. The mobile terminal according to claim 1, wherein computing the sensor output value based on the measurement value comprises subtracting a calibration coefficient from the measurement value.

11. The mobile terminal according to claim 10, wherein updating the sensor output value so as to be equal to the predetermined reference value comprises updating the calibration coefficient so that it is equal to a difference between the sensor output value and the predetermined reference value.

* * * * *